(12) United States Patent
Allison et al.

(10) Patent No.: US 10,552,525 B1
(45) Date of Patent: Feb. 4, 2020

(54) SYSTEMS, METHODS AND APPARATUSES FOR AUTOMATED FORM TEMPLATING

(71) Applicant: dotloop, LLC, Seattle, WA (US)

(72) Inventors: G. Austin Allison, Cincinnati, OH (US); Justin Y. Hu, Talmage, CA (US)

(73) Assignee: dotloop, LLC, Seattle, WA (US)

( * ) Notice: Subject to any disclaimer, the term of this patent is extended or adjusted under 35 U.S.C. 154(b) by 0 days.

(21) Appl. No.: 14/620,262

(22) Filed: Feb. 12, 2015

Related U.S. Application Data

(60) Provisional application No. 61/938,741, filed on Feb. 12, 2014.

(51) Int. Cl.
*G06F 17/24* (2006.01)
*G06Q 10/10* (2012.01)

(52) U.S. Cl.
CPC .......... *G06F 17/243* (2013.01); *G06F 17/248* (2013.01); *G06Q 10/10* (2013.01)

(58) Field of Classification Search
None
See application file for complete search history.

(56) References Cited

U.S. PATENT DOCUMENTS

| | | |
|---|---|---|
| 4,747,093 A | 5/1988 | Benne et al. |
| 4,870,576 A | 9/1989 | Tornetta |
| 5,032,989 A | 7/1991 | Tornetta |
| D321,903 S | 11/1991 | Chepaitis |
| 5,317,646 A | 5/1994 | Sang, Jr. et al. |
| 5,325,297 A | 6/1994 | Bird et al. |
| 5,361,201 A | 11/1994 | Jost |
| 5,392,388 A | 2/1995 | Gibson |
| 5,526,341 A | 6/1996 | Shiba et al. |
| 5,623,655 A | 4/1997 | Chisaka |
| 5,680,305 A | 10/1997 | Apgar |
| 5,754,850 A | 5/1998 | Janssen |
| D396,455 S | 7/1998 | Bier |
| 5,848,187 A | 12/1998 | Bricklin et al. |
| 5,943,679 A | 8/1999 | Niles et al. |
| 5,946,667 A | 8/1999 | Tull |
| 6,032,123 A | 2/2000 | Jameson |
| 6,067,831 A | 5/2000 | Amborn et al. |
| 6,289,460 B1 | 9/2001 | Hajmiragha |
| 6,401,070 B1 | 6/2002 | McManus |

(Continued)

FOREIGN PATENT DOCUMENTS

| | | |
|---|---|---|
| KR | 102002009259 | 12/2002 |
| KR | 102007005993 | 6/2007 |

(Continued)

OTHER PUBLICATIONS

U.S. Appl. No. 14/243,128, filed Apr. 2, 2014, Allison et al.

(Continued)

*Primary Examiner* — Sanchita Roy
(74) *Attorney, Agent, or Firm* — Perkins Coie LLP

(57) ABSTRACT

Systems and methods are disclosed for the automated templating of electronic forms. The templates can include user input fields corresponding to user input elements of the electronic form. The attributes of the user input field can be determined based on contextual data proximate to the user input element, such as the surrounding text. The templates can be used in various collaborative environments and electronic workflows.

20 Claims, 14 Drawing Sheets

(56) References Cited

U.S. PATENT DOCUMENTS

| | | |
|---|---|---|
| 6,519,618 B1 | 2/2003 | Snyder |
| D474,197 S | 5/2003 | Nguyen |
| D477,242 S | 7/2003 | Laats |
| 6,594,633 B1 | 7/2003 | Broeman |
| 6,609,109 B1 | 8/2003 | Bradley |
| 6,609,118 B1 | 8/2003 | Khedkar |
| 6,636,803 B1 | 10/2003 | Hartz |
| 6,684,196 B1 | 1/2004 | Mini et al. |
| 6,711,554 B1 | 3/2004 | Salzmann et al. |
| 6,810,404 B1 | 10/2004 | Ferguson et al. |
| 6,898,317 B2 | 5/2005 | Struble et al. |
| 6,944,648 B2 | 9/2005 | Cochran et al. |
| D521,019 S | 5/2006 | Ording |
| 7,143,290 B1 | 11/2006 | Ginter et al. |
| D536,343 S | 2/2007 | Fong et al. |
| D544,495 S | 6/2007 | Evans et al. |
| 7,228,319 B1 | 6/2007 | Fuchs |
| D554,660 S | 11/2007 | Hoover et al. |
| D554,661 S | 11/2007 | Hoover et al. |
| 7,299,408 B1 | 11/2007 | Daconta et al. |
| 7,334,187 B1 | 2/2008 | Stanciu |
| D566,722 S | 4/2008 | Jackson |
| 7,376,891 B2 | 5/2008 | Hitchcock et al. |
| D572,726 S | 7/2008 | Guimaraes et al. |
| 7,475,333 B2 | 1/2009 | Otter et al. |
| D591,305 S | 4/2009 | Shimoda |
| 7,543,228 B2 | 6/2009 | Kelkar et al. |
| D595,727 S | 7/2009 | Koes et al. |
| D599,284 S | 9/2009 | Misumi |
| D599,814 S | 9/2009 | Ogura et al. |
| D601,159 S | 9/2009 | Truelove et al. |
| 7,692,635 B2 | 4/2010 | Iwamura |
| 7,702,999 B1 | 4/2010 | Sperr et al. |
| D615,551 S | 5/2010 | Arnell |
| 7,725,359 B1 | 5/2010 | Katzfey et al. |
| D619,593 S | 7/2010 | Fujioka et al. |
| D624,557 S | 9/2010 | Allen et al. |
| 7,818,219 B2 | 10/2010 | Klivington et al. |
| 7,822,691 B1 | 10/2010 | Kuo |
| 7,917,842 B2 | 3/2011 | Garrison |
| 7,945,496 B2 | 5/2011 | Trott |
| 7,970,684 B1 | 6/2011 | Benda |
| 7,987,117 B2 | 7/2011 | Mozley |
| D643,047 S | 8/2011 | Guss et al. |
| D644,243 S | 8/2011 | Matas |
| D644,654 S | 9/2011 | Maitlen et al. |
| D650,790 S | 12/2011 | Jeans et al. |
| D650,807 S | 12/2011 | Impas et al. |
| D652,426 S | 1/2012 | Anzures |
| D654,925 S | 2/2012 | Nishizawa et al. |
| 8,145,909 B1 | 3/2012 | Agrawal et al. |
| D656,954 S | 4/2012 | Arnold et al. |
| 8,151,209 B2 | 4/2012 | Law et al. |
| D659,711 S | 5/2012 | Guss et al. |
| D660,317 S | 5/2012 | Jesberger |
| D664,205 S | 7/2012 | Xu et al. |
| D665,161 S | 8/2012 | Leifeld et al. |
| D665,162 S | 8/2012 | Leifeld et al. |
| D665,163 S | 8/2012 | Leifeld et al. |
| D665,421 S | 8/2012 | Morrow et al. |
| 8,239,496 B2 | 8/2012 | Peterson et al. |
| D667,429 S | 9/2012 | Wujcik et al. |
| D669,497 S | 10/2012 | Lee et al. |
| D669,499 S | 10/2012 | Gardner et al. |
| D671,558 S | 11/2012 | Anzures et al. |
| D676,060 S | 2/2013 | Frost et al. |
| D676,457 S | 2/2013 | Frost et al. |
| 8,375,016 B2 | 2/2013 | Allison et al. |
| D677,180 S | 3/2013 | Plitkins et al. |
| D682,305 S | 5/2013 | Mierau et al. |
| D682,882 S | 5/2013 | Cahill et al. |
| D683,757 S | 6/2013 | Phelan |
| D684,185 S | 6/2013 | van Dongen et al. |
| D684,990 S | 6/2013 | Walsh |
| D687,046 S | 7/2013 | Plitkins et al. |
| D687,057 S | 7/2013 | Plitkins |
| D687,460 S | 8/2013 | Tyler et al. |
| D687,851 S | 8/2013 | Sloo et al. |
| D689,505 S | 9/2013 | Convay et al. |
| D690,717 S | 10/2013 | Thomsen et al. |
| D690,718 S | 10/2013 | Thomsen et al. |
| D691,629 S | 10/2013 | Matas et al. |
| D692,444 S | 10/2013 | Lee et al. |
| 8,583,562 B1 | 11/2013 | McDaniel |
| D696,265 S | 12/2013 | d'Amore et al. |
| D697,076 S | 1/2014 | Oda et al. |
| D697,518 S | 1/2014 | Thomsen et al. |
| D697,519 S | 1/2014 | Thomsen et al. |
| D697,935 S | 1/2014 | Lee et al. |
| D698,363 S | 1/2014 | Asai |
| D699,248 S | 2/2014 | Pearson et al. |
| D699,250 S | 2/2014 | Fujii et al. |
| D699,741 S | 2/2014 | Wantland et al. |
| D699,750 S | 2/2014 | Pearson et al. |
| D700,207 S | 2/2014 | Pearson et al. |
| 8,650,067 B1 | 2/2014 | Moss |
| 8,683,315 B2 | 3/2014 | Stover |
| D703,683 S | 4/2014 | Skidgel |
| D704,204 S | 5/2014 | Rydenhag |
| D705,263 S | 5/2014 | Hartley |
| D705,808 S | 5/2014 | Anzures et al. |
| D706,814 S | 6/2014 | Phelan |
| D707,705 S | 6/2014 | Folken |
| D708,203 S | 7/2014 | Johnson |
| D708,221 S | 7/2014 | Danton et al. |
| D708,226 S | 7/2014 | Takata et al. |
| D709,917 S | 7/2014 | Faulkner et al. |
| D711,421 S | 8/2014 | Bautista |
| D715,313 S | 10/2014 | Hontz, Jr. |
| D715,322 S | 10/2014 | Sakata |
| D716,325 S | 10/2014 | Brudnicki |
| D717,334 S | 11/2014 | Sakuma |
| D717,335 S | 11/2014 | Sakuma |
| D717,681 S | 11/2014 | Shail et al. |
| D717,822 S | 11/2014 | Brotman et al. |
| D717,823 S | 11/2014 | Brotman et al. |
| D718,325 S | 11/2014 | Schoger et al. |
| D721,090 S | 1/2015 | Hong et al. |
| D721,093 S | 1/2015 | Pereira |
| 9,330,375 B2 | 5/2016 | Allison et al. |
| 10,062,110 B1 | 8/2018 | Tatang |
| 2001/0039506 A1 | 11/2001 | Robbins |
| 2002/0035520 A1 | 3/2002 | Weiss |
| 2002/0065739 A1 | 5/2002 | Florance |
| 2002/0069358 A1 | 6/2002 | Silvester |
| 2002/0082849 A1 | 6/2002 | Tenorio |
| 2002/0087389 A1 | 7/2002 | Sklarz |
| 2002/0099733 A1 | 7/2002 | Teruuchi et al. |
| 2002/0129656 A1 | 9/2002 | Tsuzuki |
| 2002/0135440 A1 | 9/2002 | Ryhanen |
| 2002/0184485 A1 | 12/2002 | Dray et al. |
| 2003/0056100 A1 | 3/2003 | Beatson |
| 2003/0101063 A1 | 5/2003 | Sexton |
| 2003/0121008 A1 | 6/2003 | Tischer |
| 2003/0191719 A1 | 10/2003 | Ginter et al. |
| 2003/0220807 A1 | 11/2003 | Hoffman et al. |
| 2003/0229552 A1 | 12/2003 | Lebaric |
| 2003/0236832 A1 | 12/2003 | McIntyre et al. |
| 2004/0098284 A1 | 5/2004 | Petito et al. |
| 2004/0128215 A1 | 7/2004 | Florance |
| 2004/0133493 A1 | 7/2004 | Ford et al. |
| 2004/0181749 A1* | 9/2004 | Chellapilla ............ G06F 17/243 715/222 |
| 2004/0205534 A1 | 10/2004 | Koelle |
| 2004/0205653 A1 | 10/2004 | Hadfield et al. |
| 2004/0220885 A1 | 11/2004 | Salzmann et al. |
| 2004/0225884 A1 | 11/2004 | Lorenzini et al. |
| 2004/0255114 A1 | 12/2004 | Lee et al. |
| 2005/0086596 A1 | 4/2005 | Koch et al. |
| 2005/0108025 A1 | 5/2005 | Cagan |
| 2005/0177389 A1 | 8/2005 | Rakowicz et al. |
| 2005/0251535 A1 | 11/2005 | Theissen et al. |
| 2005/0273417 A1 | 12/2005 | Budish |

(56) References Cited

U.S. PATENT DOCUMENTS

| | | |
|---|---|---|
| 2006/0007189 A1* | 1/2006 | Gaines, III ............ G06F 17/243 345/179 |
| 2006/0015435 A1 | 1/2006 | Nathanson |
| 2006/0026032 A1 | 2/2006 | Higgins |
| 2006/0026136 A1 | 2/2006 | Drucker et al. |
| 2006/0069599 A1 | 3/2006 | Hatoun et al. |
| 2006/0085311 A1 | 4/2006 | Hoerle et al. |
| 2006/0116952 A1 | 6/2006 | Orfano |
| 2006/0190810 A1* | 8/2006 | Piersol ............... G06F 17/2725 715/236 |
| 2006/0200308 A1 | 9/2006 | Arutunian |
| 2006/0259440 A1 | 11/2006 | Leake et al. |
| 2007/0005383 A1 | 1/2007 | Kasower |
| 2007/0009158 A1 | 1/2007 | Geva et al. |
| 2007/0022141 A1 | 1/2007 | Singleton |
| 2007/0038533 A1 | 2/2007 | Huff |
| 2007/0088958 A1 | 4/2007 | Qa'Im-maqami |
| 2007/0118391 A1* | 5/2007 | Malaney ............... G06Q 10/00 382/229 |
| 2007/0136361 A1 | 6/2007 | Lee et al. |
| 2007/0136679 A1 | 6/2007 | Yang |
| 2007/0168382 A1* | 7/2007 | Tillberg ............ G06F 17/30253 |
| 2007/0186157 A1 | 8/2007 | Walker |
| 2008/0091700 A1 | 4/2008 | Brotherson |
| 2008/0091954 A1 | 4/2008 | Morris et al. |
| 2008/0097777 A1 | 4/2008 | Rielo |
| 2008/0133319 A1 | 6/2008 | Adiga |
| 2008/0154740 A1 | 6/2008 | Lee |
| 2008/0155391 A1 | 6/2008 | Sattler et al. |
| 2008/0167941 A1 | 7/2008 | Kagarlis |
| 2008/0209313 A1 | 8/2008 | Gonser |
| 2008/0260287 A1 | 10/2008 | Berryman et al. |
| 2008/0262833 A1 | 10/2008 | Kano et al. |
| 2008/0288312 A1 | 11/2008 | Miles |
| 2008/0301064 A1 | 12/2008 | Burns |
| 2008/0319890 A1 | 12/2008 | Urbanski |
| 2009/0003588 A1 | 1/2009 | Ross |
| 2009/0006241 A1 | 1/2009 | Zhao |
| 2009/0018975 A1 | 1/2009 | Geltner |
| 2009/0024912 A1 | 1/2009 | McCabe et al. |
| 2009/0029786 A1 | 1/2009 | Chen et al. |
| 2009/0043685 A1 | 2/2009 | Benjamin |
| 2009/0109455 A1 | 4/2009 | Smith et al. |
| 2009/0173552 A1 | 7/2009 | Elder et al. |
| 2009/0226090 A1* | 9/2009 | Okita ................ G06K 9/00442 382/187 |
| 2009/0320035 A1 | 12/2009 | Ahlgren |
| 2010/0011286 A1 | 1/2010 | Isoda |
| 2010/0023379 A1 | 1/2010 | Rappaport |
| 2010/0076903 A1 | 3/2010 | Klingenberg |
| 2010/0131331 A1 | 5/2010 | Ginsburg |
| 2010/0161498 A1 | 6/2010 | Walker |
| 2010/0235727 A1 | 9/2010 | Ashton et al. |
| 2010/0287260 A1 | 11/2010 | Peterson et al. |
| 2011/0178905 A1 | 7/2011 | Kagarlis |
| 2011/0199631 A1 | 8/2011 | Healy |
| 2011/0258535 A1 | 10/2011 | Adler, III et al. |
| 2011/0270766 A1 | 11/2011 | Ramakrishnan et al. |
| 2011/0276395 A1 | 11/2011 | Gaton et al. |
| 2011/0276875 A1 | 11/2011 | McCabe et al. |
| 2011/0313945 A1 | 12/2011 | Callan |
| 2011/0314371 A1 | 12/2011 | Peterson et al. |
| 2012/0063684 A1* | 3/2012 | Denoue ............... G06F 17/243 382/175 |
| 2012/0066061 A1 | 3/2012 | Clement |
| 2012/0096383 A1 | 4/2012 | Sakamoto et al. |
| 2012/0102002 A1 | 4/2012 | Sathyanarayana |
| 2012/0144285 A1 | 6/2012 | Bach et al. |
| 2012/0209875 A1 | 8/2012 | Hintze |
| 2012/0254045 A1 | 10/2012 | Orfano |
| 2012/0254156 A1 | 10/2012 | Rao |
| 2012/0297277 A1* | 11/2012 | King ................ G06K 9/00442 715/201 |
| 2012/0297301 A1 | 11/2012 | Mahoney et al. |
| 2013/0024788 A1 | 1/2013 | Olsen et al. |
| 2013/0086624 A1 | 4/2013 | Powell |
| 2013/0096819 A1 | 4/2013 | Tarnok |
| 2013/0097478 A1 | 4/2013 | Allison et al. |
| 2013/0097480 A1 | 4/2013 | Allison et al. |
| 2013/0185753 A1 | 7/2013 | Kliot |
| 2013/0211945 A1 | 8/2013 | Po-Ching |
| 2013/0238965 A1* | 9/2013 | Barrus ............... G06K 9/00449 715/223 |
| 2013/0297442 A1 | 11/2013 | Simons |
| 2013/0317939 A1 | 11/2013 | Urbanski |
| 2013/0325623 A1 | 12/2013 | Balduf |
| 2013/0325665 A1 | 12/2013 | Shaffer |
| 2013/0346151 A1 | 12/2013 | Bleakley |
| 2014/0033088 A1 | 1/2014 | Shaver |
| 2014/0164255 A1 | 6/2014 | Daly |
| 2014/0164260 A1 | 6/2014 | Spieckerman |
| 2014/0229543 A1 | 8/2014 | Allison et al. |
| 2014/0236751 A1 | 8/2014 | Bloomfield |
| 2015/0081497 A1 | 3/2015 | Patel |
| 2015/0242747 A1 | 8/2015 | Packes |
| 2015/0317701 A1 | 11/2015 | Thomas |
| 2015/0332371 A1 | 11/2015 | Lomas |
| 2017/0322681 A1 | 11/2017 | Allison |
| 2018/0225593 A1 | 8/2018 | Cozine |

FOREIGN PATENT DOCUMENTS

| | | | |
|---|---|---|---|
| WO | WO-1996007156 A1 | 3/1996 | |
| WO | WO 0106416 A2 * | 1/2001 | ......... G06F 17/2264 |
| WO | WO-2009012475 A1 | 1/2009 | |
| WO | WO-2010105262 A1 | 9/2010 | |
| WO | WO-2010151630 A2 | 12/2010 | |
| WO | WO-2011056819 A1 | 5/2011 | |
| WO | WO-2011139563 A2 | 11/2011 | |

OTHER PUBLICATIONS

U.S. Appl. No. 14/620,262, filed Feb. 12, 2015, Allison et al.
U.S. Appl. No. 14/842,267, filed Sep. 1, 2015, Allison et al.
U.S. Appl. No. 15/131,747, filed Apr. 18, 2016, Allison et al.
International Search Report dated Feb. 22, 2010 for Application No. PCT/US2009/061012.
Written Opinion of the International Searching Authority, PCT/US2008/070566, dated Feb. 19, 2009, 4 pages.
International Search Report, PCT/US2010/039768, dated Feb. 23, 2011, 4 pages.
International Search Report, PCT/US2011/033194, dated Nov. 28, 2011, 4 pages.
International Search Report, PCT/US2011/040218, dated Feb. 17, 2012, 3 pages.
International Search Report; PCT/US2012/046386; dated Oct. 5, 2012; 2 pages.
Written Opinion of the International Searching Authority; PCT/US2012/046386; dated Oct. 5, 2012; 7 pages.
U.S. Appl. No. 15/135,398, filed Apr. 21, 2016, Allison et al.
Adobe Acrobat DC, "Convert existing forms to fillable PDFs," 2015, 12 pages.
Adobe Acrobat XI, "Convert an existing form into a fillable PDF form with Adobe Acrobat XI," Quick Start Guide, 2012, 1 page.
Nuance, Power PDF How to: Create Fillable PDF Form, "How to get started, and get more out of your PDF's," 4 pages.
FH FA, "House Price Index Frequently Asked Questions," Federal Housing Finance Agency, Aug. 2018, available at https://www.ihfa.gov/Media/PublicAffairs/Pages/House-Price-Index-Frequently-Asked-Questions.aspx (accessed Oct. 29, 2018). (Year: 2018).
Final Office Action for U.S. Appl. No. 14/177,656; dated Oct. 18, 2018; 30 pages.
Final Office Action for U.S. Appl. No. 14/177,656; dated Dec. 28, 2017; 25 pages.
Final Office Action for U.S. Appl. No. 14/842,267; dated May 21, 2018; 25 pages.
Kiplinger Personal Finance, "Before Submitting a Home Offer, Make Sure All Bases Are Covered," Jan. 2015, available at https

(56) References Cited

OTHER PUBLICATIONS

://www.kiplinger.com/article/real-estate/T029-COOO-SOO 1-6-ways-to-stage-your-home-for-less-than-1-000 .html (access Oct. 28, 2018).
Non-Final Office Action for U.S. Appl. No. 13/547,120; dated Nov. 1, 2017; 14 pages.
Non-Final Office Action for U.S. Appl. No. 14/177,656; dated Apr. 4, 2018; 28 pages.
Non-Final Office Action for U.S. Appl. No. 15/131,747; dated Sep. 7, 2018; 38 pages.
Non-Final Office Action for U.S. Appl. No. 15/131,747; dated Feb. 5, 2018; 38 pages.
Non-Final Office Action for U.S. Appl. No. 15/135,398; dated Nov. 7, 2018; 99 pages.
Notice of Allowance for U.S. Appl. No. 13/547,120; dated Jun. 28, 2018; 10 pages.
U.S. Appl. No. 16/135,282 for Allison, filed Sep. 19, 2018.
Final Office Action for U.S. Appl. No. 15/135,398; dated Jun. 10, 2019; 99 pages.
Final Office Action for U.S. Appl. No. 15/131,747; dated Jun. 14, 2019; 14 pages.
Non-Final Office Action for U.S. Appl. No. 14/842,267; dated Jun. 17, 2019; 30 pages.
Final Office Action for U.S. Appl. No. 15/436,617; dated Jul. 3, 2019; 21 pages.
Non-Final Office Action for U.S. Appl. No. 14/177,656; dated Apr. 19, 2019; 31 pages.
Non-Final Office Action for U.S. Appl. No. 15/436,617, dated Mar. 13, 2019; 20 pages.
Non-Final Office Action for U.S. Appl. No. 15/436,617; dated Nov. 28, 2018; 16 pages.

\* cited by examiner

| DOC ID | FIELD ID | START POINT (x,y) | END POINT (x,y) | TAG |
|---|---|---|---|---|
| 23456 | 1A | 24, 144 | 95, 510 | Printed Name |
| 23456 | 1B | 98, 144 | 173, 150 | Signature |
| 23456 | 1C | 32, 113 | 93, 116 | Department |
| 23456 | 1D | 136, 113 | 178, 116 | Office Telephone |
| 23456 | 1E | 40, 98 | 178, 110 | Home Address |
| 23456 | 1F | 48, 95 | 178, 98 | Driver's License |

REAL ESTATE SALES CONTRACT

Seller, __/ 804 A__, hereby agrees to sell to the Buyer, __/ 806 A__, the real property set forth below and all improvements thereon (herein referred to as the Property), the Buyer agrees to purchase said Property from the Seller on the terms and conditions set forth in this contract. A 802

The Property is located in __/ 808A__ County, (city/state) __/ 810A__, and is commonly known as (address) __/ 812A__, has approximate lot dimensions of __/ 814A__ X __/ 816A__

↙ 802

Purchase Price: The total purchase price to be paid for the Property by the Buyer is payable as follows:
(a)........................Initial deposit __/ 818A__

800

START
Back
Next
Cancel

REAL ESTATE SALES CONTRACT

Seller, ▓▓▓▓▓▓▓, hereby agrees to sell to the Buyer, _____, the real property set forth below and all improvements thereon (herein referred to as the Property), the Buyer agrees to purchase said Property from the Seller on the terms and conditions set forth in this contract.

The Property is located in _____ County, (city/state) _____, and is commonly known as (address) _____, has approximate lot dimensions of _____ X _____.

Purchase Price: The total purchase price to be paid for the Property by the Buyer is payable as follows:
(a)........................Initial deposit _____

850

FIELD 1: "Seller"?
Yes ●
No ○

Back
Next
Cancel

REAL ESTATE SALES CONTRACT

Seller, _____, hereby agrees to sell to the Buyer, _____, the real property set forth below and all improvements thereon (herein referred to as the Property), the Buyer agrees to purchase said Property from the Seller on the terms and conditions set forth in this contract.

The Property is located in ▓▓▓▓ County, (city/state) _____, and is commonly known as (address) _____, has approximate lot dimensions of _____ X _____.

Purchase Price: The total purchase price to be paid for the Property by the Buyer is payable as follows:
(a).................................Initial deposit _____

FIELD 3:
"County" ○
"City" ○
<type> ○

Back
Next
Cancel

FIG. 8D

REAL ESTATE SALES CONTRACT

Seller, _____, hereby agrees to sell to the Buyer, _____, the real property set forth below and all improvements thereon (herein referred to as the Property), the Buyer agrees to purchase said Property from the Seller on the terms and conditions set forth in this contract.

The Property is located in _____ County, (city/state) _____, and is commonly known as (address) _____, has approximate lot dimensions of ▓▓▓▓ X _____.

Purchase Price: The total purchase price to be paid for the Property by the Buyer is payable as follows:
(a).................................Initial deposit _____

FIELD 6:
"Lot Width"?
Yes ●
No ○

Number Input only?
Yes ●
No ○

Back
Next
Cancel

SYSTEMS, METHODS AND APPARATUSES FOR AUTOMATED FORM TEMPLATING

CROSS REFERENCE TO RELATED APPLICATION

This application claims the benefit of U.S. provisional patent application Ser. No. 61/938,741, filed on Feb. 12, 2014, entitled, SYSTEMS, METHODS AND APPARATUSES FOR AUTOMATED FORM TEMPLATING, the disclosure of which is hereby incorporated by reference in its entirety.

TECHNICAL FIELD

The systems, methods, and apparatuses described below relate generally to electronic forms, and more particularly to the automated templating of electronic forms for use in electronic workflows.

BACKGROUND

Business transactions between parties are usually formalized by signing documents that specify the terms of the agreement between the parties. The nature of the business transaction can determine the number and complexity of the documents.

In the context of real estate transactions, for example, there can be multiple different forms, signed at different times by buyers, sellers, real estate agents, and escrow agents, among others. When a seller places their home on the market for sale, the seller often signs a listing agreement with a real estate agent. When an interested buyer makes an offer on the home, the buyer can condition the offer upon a number of contingencies, such as a home inspection, the sale of the buyer's current home, and other contingencies, that become part of the offer. The seller may make counteroffers. This process may go back and forth until an agreement is reached. At that point, the agreed upon price and all of the conditions are signed by the parties and a binding contract is formed. Most of the time the parties are not in the same physical location when the offers, counteroffers, and acceptances are signed. Fax machines are often used to facilitate the process, as well as emailing scanned documents.

BRIEF DESCRIPTION OF THE DRAWINGS

FIGS. 6-7 depict an operational example of processing an electronic form to identify user input elements and the associated user input fields.

FIGS. 8A-8F depict example processing of an electronic form in accordance with various embodiments.

DETAILED DESCRIPTION

Figure 1:
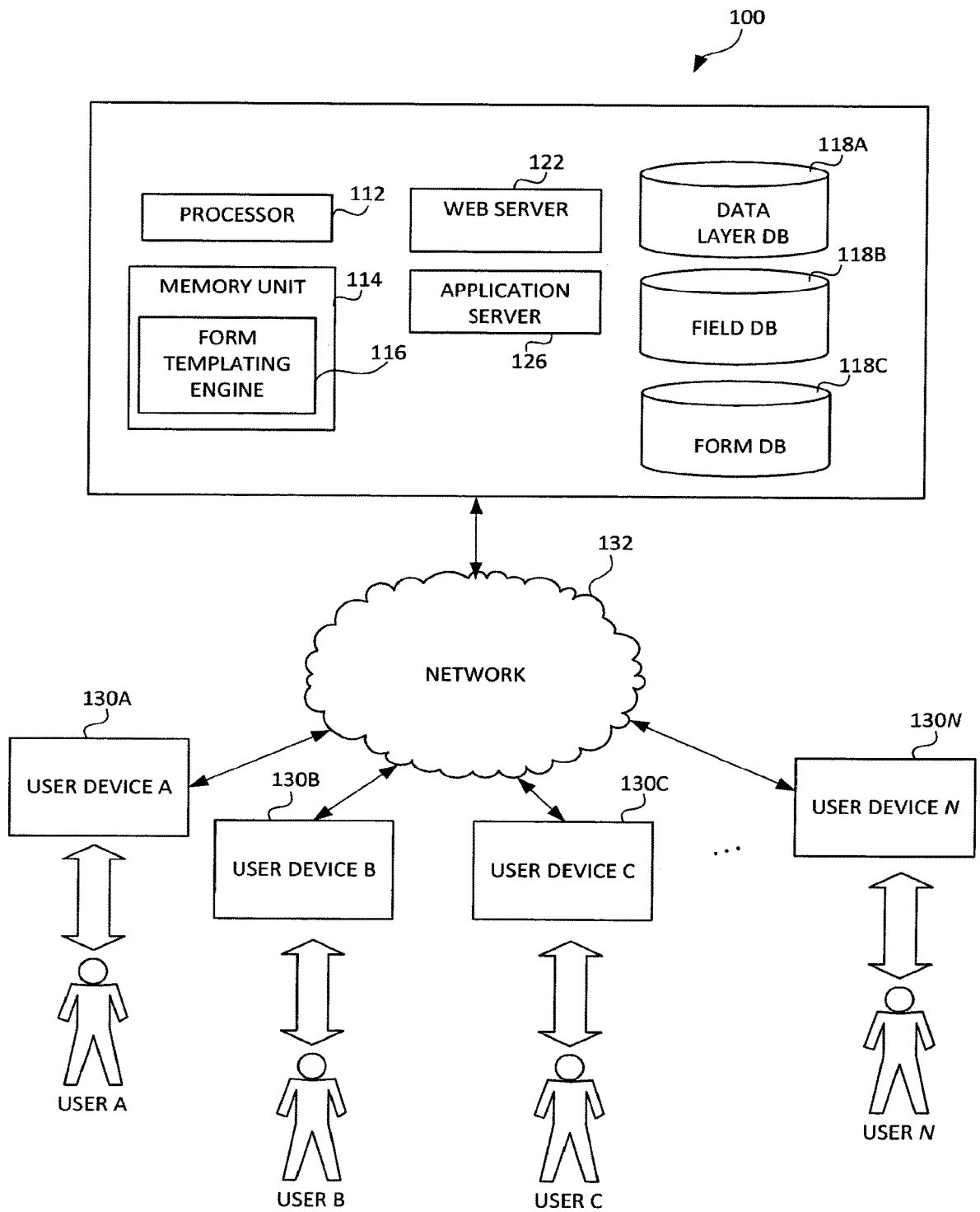
FIG. 1 depicts a form templating computing system in accordance with one non-limiting embodiment.

Various non-limiting embodiments of the present disclosure will now be described to provide an overall understanding of the principles of the structure, function, and use of systems, apparatuses, devices, and methods disclosed herein for the automated templating of electronic forms and documents. One or more examples of these non-limiting embodiments are illustrated in the selected examples disclosed and described in detail with reference made to FIGS. 1-10 in the accompanying drawings. Those of ordinary skill in the art will understand that the systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Traditionally, forms used in various transactions can be pre-printed paper forms, or can be forms in electronic format. Example electronic formats include Adobe Portable Document Format (PDF), Microsoft Word, Rich Text Format (RTF), or any other suitable electronic format as would be understood in the art. Forms in electronic format can be printed and information entered by hand. Some forms permit information to be entered directly into the form using, for example, a computing device or computer. For a typical business transaction, there may be multiple ways of entering information into the various forms needed to formalize the transaction, including editing text in a Word document, filling in a field of a PDF form, and signing a printed form. The presently disclosed embodiments are generally directed to systems and methods for generating or creating templates for electronic forms aid in the entry of data relevant to the electronic form. In some embodiments, the templates (i.e., user input field layers) can be used in various collaborative environments, such as the collaborative environments described in U.S. Pat. App. Publ. No. US 2013/0097480, the entirety of which is incorporated herein by reference.

Referring now to FIG. 1, one example embodiment of the present disclosure can comprise a form templating computing system 100 that generally controls the generation of electronic templates that are based on underlying electronic forms. The form templating computing system 100 can be a component of, or otherwise associated with, other computer-based systems, such as systems for facilitating online transactions, social networking systems, business or enterprise platforms, payment platforms, and so forth. In one example embodiment, the form templating computing system 100 is associated with the interactive real estate contract and negotiation tool described in U.S. Pat. App. Pub. No. 2010/0100522, the entirety of which is incorporated herein by reference. In any event, the form templating computing system 100 can be provided using any suitable processor-based device or system, such as a personal computer, laptop, server, mainframe, or a collection (e.g., network) of multiple computers, for example. The form templating computing system 100 can include one or more processors 112 and one or more computer memory units 114. For convenience, only one processor 112 and only one memory unit 114 are shown in FIG. 1. The processor 112 can execute software instructions stored on the memory unit 114. The processor 112 can be implemented as an integrated circuit (IC) having one or multiple cores. The memory 114 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 114 can store executable software and data for a form templating engine 116. When the processor 112 of the form templating computing system 100 executes the software of the form templating engine 116, the processor 112 can be caused to perform the various operations of the form templating computing system 100, such as identifying fields in an electronic form, contextually tagging the fields, and updating the contextual tags over time, as discussed in more detail below. Data used by the form templating engine 116 can be from various sources, such as any of the data stores 118A, 118B, 118C, which can be electronic computer databases, for example (collectively referred to herein as data store 118). The data stored in the data store 118 can be stored in a non-volatile computer memory, such as a hard disk drive, a read only memory (e.g., a ROM IC), or other types of non-volatile memory. Also, the data of the data store 118 can be stored on a remote electronic computer system, for example.

The form templating computing system 100 can be in communication with user devices 130A-N via an electronic communications network 132. The communications network 132 can include a number of computer and/or data networks, including the Internet, LANs, WANs, GPRS networks, etc., and can comprise wired and/or wireless communication links. The user devices 130A-N that communicate with the form templating computing system 100 can be any type of client device suitable for communication over the network 132, such as a personal computer, a laptop computer, a tablet computer, or a netbook computer, for example. In some example embodiments, a user can communicate with the network 132 via a device 130 that is a combination handheld computer and mobile telephone, sometimes referred to as a smart phone. It can be appreciated that while certain embodiments can be described with users communicating via a smart phone or laptop by way of example, the communication can be implemented using other types of user equipment or wireless computing devices such as a mobile telephone, personal digital assistant (PDA), combination mobile telephone/PDA, handheld device, mobile unit, subscriber station, game device, messaging device, media player, pager, or other suitable mobile communications devices.

The user devices 130A-N can provide a variety of applications for allowing a user to accomplish one or more specific tasks using the form templating computing system 100. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), contacts application, calendar application and so forth. The user device 130 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a MICROSOFT OS, APPLE OS, UNIX OS, LINUX OS, and others.

In general, an application, such as a web browsing application, can provide a user interface to communicate information between the form templating computing system 100 and the users via the user devices 130A-N. The user devices 130A-N can include various components for interacting with the application such as a display for presenting the user interface and a keypad for inputting data and/or commands. The user devices 130A-N can include other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a camera, and so forth. Through the interface, the users can interact with the form templating computing system 100.

The applications can include or be implemented as executable computer program instructions stored on computer-readable storage media such as volatile or non-volatile memory capable of being retrieved and executed by a processor to provide operations for the user devices 130A-N. The memory can also store various databases and/or other types of data structures (e.g., arrays, files, tables, records) for storing data for use by the processor and/or other elements of the user devices 130A-N.

As shown in FIG. 1, the form templating computing system 100 can include several computer servers and databases. For example, the form templating computing system 100 can include one or more web servers 122 and application servers 126. For convenience, only one web server 122 and one application server 126 are shown in FIG. 1, although it should be recognized that the invention is not so limited. The servers 122, 126 can comprise processors (e.g., CPUs), memory units (e.g., RAM, ROM), non-volatile storage systems (e.g., hard disk drive systems), etc.

The web server 122 can provide a graphical web user interface through which users of the system can interact with the form templating computing system 100. The web server 122 can accept requests, such as HTTP requests, from clients (such as web browsers on the user devices 130A-N), and serve the clients responses, such as HTTP responses, along with optional data content, such as web pages (e.g., HTML documents) and linked objects (such as images, etc.).

The application server 126 can provide a user interface for users who do not communicate with the form templating computing system 100 using a web browser. Such users can have special software installed on their user devices 130A-N that allows them to communicate with the application server 126 via the network 132. Such software can be downloaded, for example, from the form templating computing system 100, or other software application provider, over the network to such user devices 130A-N.

Although FIG. 1 depicts a limited number of elements for purposes of illustration, it can be appreciated that the form templating computing system 100 can include more or less elements as well as other types of elements in accordance with the described embodiments. Elements of the form templating computing system 100 can include physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

The types or roles of Users A-N shown in FIG. 1 that interact with the form templating computing system 100 can vary. The type of user can depend, for example, on the type of transaction or underlying event that connects the Users A-N. By way of example, for a real estate transaction, the Users A-N can include one or more lenders, one or more real estate agents, one or more buyers, and one or more sellers.

Figure 2:
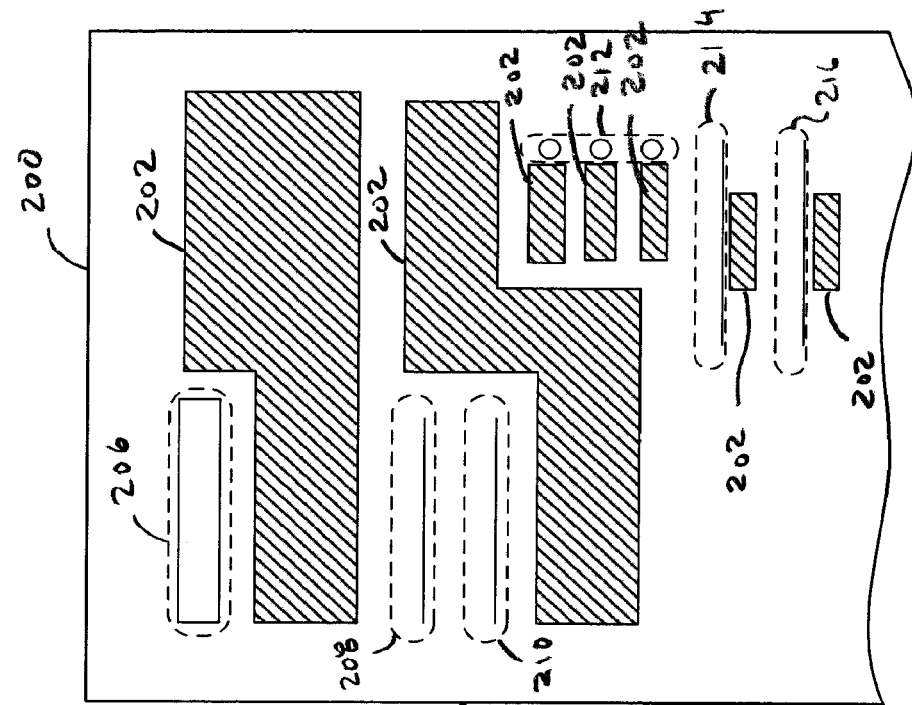
FIG. 2 generally depicts an automated identification of user input elements of an electronic form.
Figure 2:
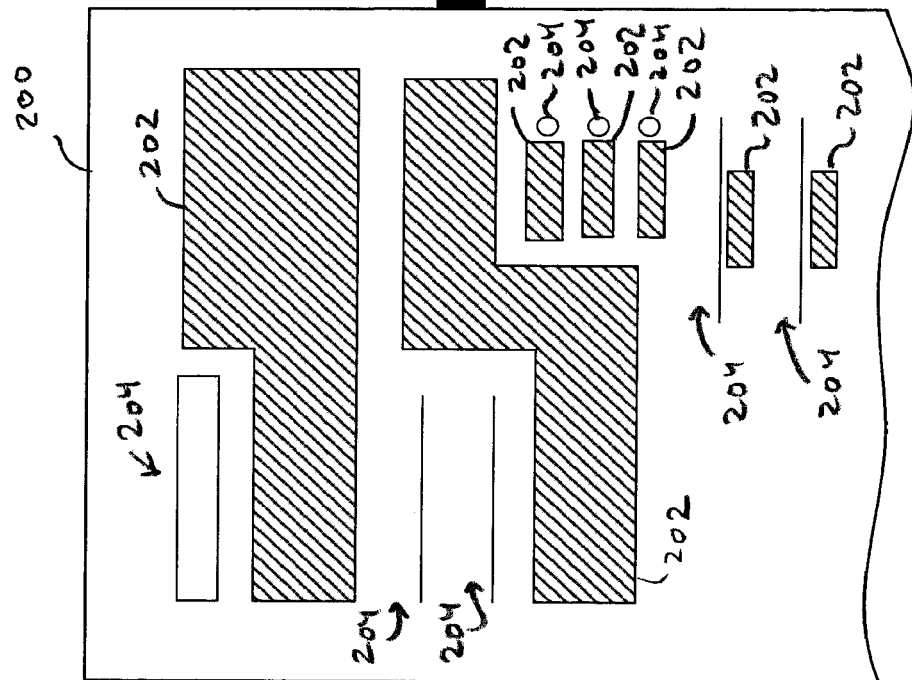

FIG. 2 generally depicts the automated identification of user input elements of an electronic form. An exemplary electronic form 200 is shown having a plurality of user input elements 204 along with text portions 202. The electronic form 200 can be provided to the system in any suitable electronic format, such as a portable document format (PDF), a tagged image file format (TIFF), a bitmap (BMP) image format, a Microsoft Word document format, and so forth. As shown, the user input elements 204 can vary, as some are boxes, some are lines, some are radio buttons. Other types of electronic forms can utilize other types of user input elements 204. In any event, the user input elements 204 represent areas on the electronic form 200 in which a user of the form is to supply information, either in the form of words, numbers, selections, or otherwise. After the system has processed the form, as described in more detail, user input fields 206, 208, 210, 212, 214, 216 are identified. Each user input field corresponds to one or more user input elements of the underlying electronic form 200. The user input fields can generally be identified through image processing of the electronic form, with little or no input from a user.

In some embodiments, each user input field 206, 208, 210, 212, 214, 216 is tagged by the system with various attributes. The attributes can include a contextual tag that identifies the data that is to be supplied to the field. The contextual tag can be based on, for example, text 202 that is positioned proximate to the user input element 204. By way of example, if the word "Full Legal Name" appears directly underneath a user input field, the system can contextually tag the corresponding user input field with "Full Legal Name." In some embodiments, optical character recognition (OCR) is used to scan and interpret the text portions 202. Text portions 202 that are proximate to a user input element can be interpreted in an attempt to provide a contextual tag to the user input element. In some embodiments, one or more contextual tags can be suggested to a user of the system, with the user selecting a particular contextual tag. In some embodiments, when a user is supplying data to the user input fields, the user can optionally update one or more contextual tags associated with the user input fields. In this fashion, the contextual tags can be updated over time to increase the overall accuracy of the user input fields. Furthermore, the electronic form 200 can have, or be assigned, a document identifier such that the system can associate the input field 206, 208, 210, 212, 214, 216 with the particular electronic form 200.

Figure 3:
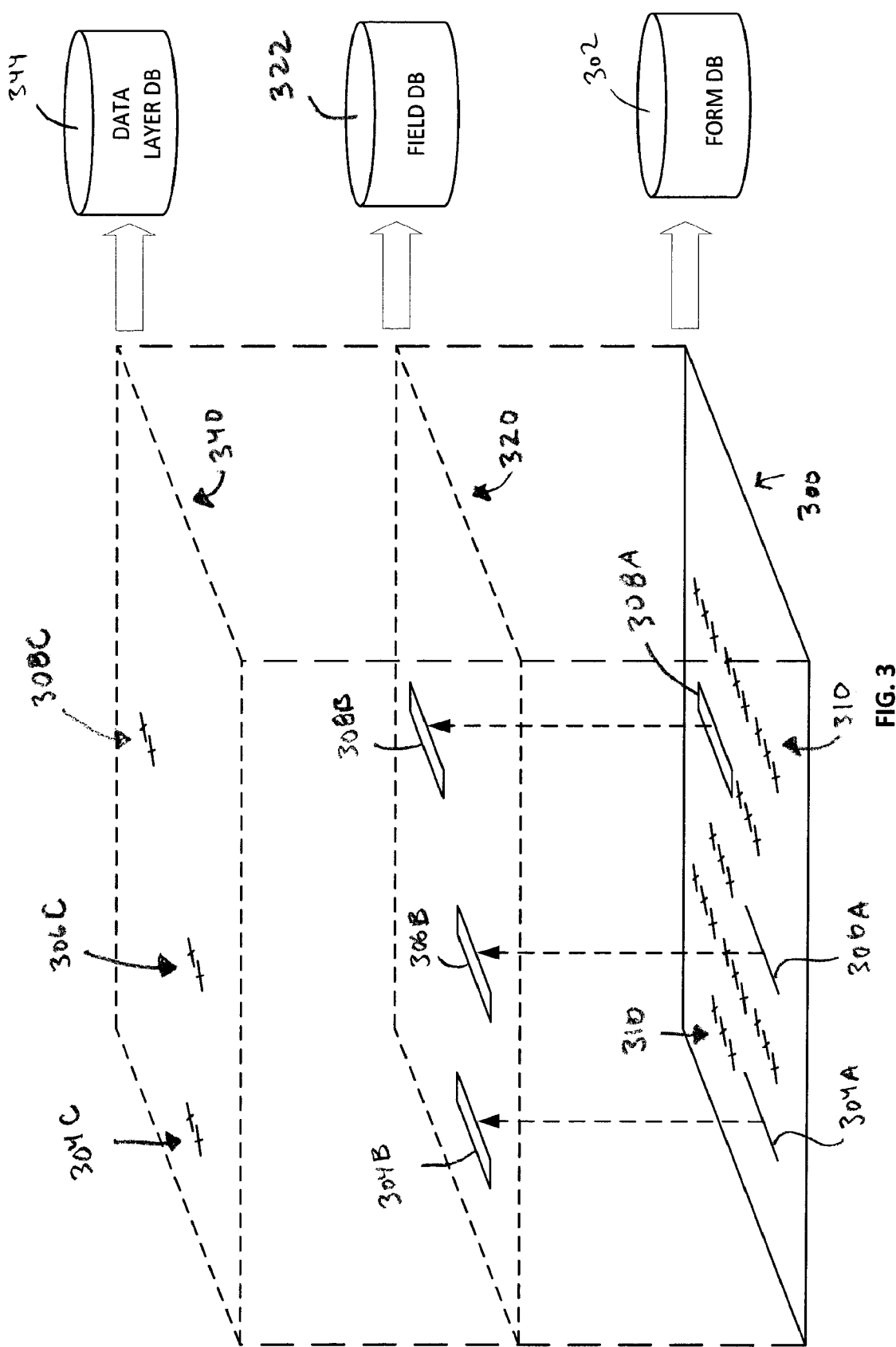
FIGS. 3, 4A and 4B schematically depict various electronic layers that can be supplied to, or generated by, a form templating computing system in accordance with non-limiting embodiments.

FIG. 3 schematically depicts various electronic layers that can be supplied to, or generated by, a form templating computing system in accordance with one non-limiting embodiment. The electronic form 300 can be, for example, a user supplied document. The electronic form 300 can be pulled from, or stored in, the form database 302. The electronic form 300 can comprises user input elements 304A, 306A and 308A. As shown, the user input elements comprise a line on the electronic form 300 (user input elements 304A, 306A) and a box (user input element 308A). The electronic form 300 also comprises text portions 310. The text portions 310 can comprise sub-portions that provide context for the user input elements 304A, 306A, and 308A. Other sub-portions of the text portions 310 can be unrelated to the user input elements 304A, 306A and 308A. The electronic form 300 can also comprises a unique electronic identification or fingerprint, referred to generally as a document ID. The document ID can be generated by the form templating computing system (such as through a hash process) or the document ID can be native to the electronic form. During the form templating process described herein, a user input field layer 320 (sometime referred to as a template) can be generated that comprises user input fields 304B, 306B, and 308B. Each user input field 304B, 306B, and 308B can correspond to an underlying user input element 304A, 306A, and 308A of the electronic form 300. The user input fields 304B, 306B, and 308B can dimensionally correspond such that they are generally aligned with the underlying user input element 304A, 306A, and 308A. The user input elements 304A, 306A, and 308A can be stored in the field database 322. In some embodiments, contextual tags are associated with each of the user input elements 304A, 306A, and 308A. The contextual tags can be based on the sub-portions of the text-portions 310 that provide context for the user input fields 304B, 306B, and 308B. Generally, text that is immediately proximate to the user input elements 304A, 306A, and 308A can be processed to identify the contextual tags. In many cases, the text that immediately proceeds or trails the user input element or is positioned immediately above or below the user input element can be used by the system to determine, or at least suggest, the appropriate contextual tags.

The user input field layer 320 can also have a higher or lower resolution than the underlying electronic form 300. For example, the electronic form 300 can be a standard letter size, or 8.5" by 11" document, that has been scanned to an image using a 100 dpi, or dot-per-inch, scanning resolution. When used by the form templating computing system at 100% zoom, the electronic form 300 is displayed as 850 by 1100 pixel image. The user input field layer 320 can be the same resolution as the electronic form 300 or user input field layer 320 can be a higher or lower resolution. For example, the user input field layer 320 can use a 300 dpi resolution to allow finer control over the positions of the user input fields on the user input field layer 320 relative to the electronic form 300.

Once one or more user input fields 304B, 306B, and 308B have been identified, a user can supply user data inputs 304C, 306C, and 308C to a data layer 340. The user data inputs can be stored in the data layer database 344. In some embodiments, a particular user input element may appear in a plurality of instances on the electronic form 300. Once the user supplies a user data input for one of the instances, the remaining instances can be automatically populated with the user data input to reduce the amount of redundant user data inputs required by the user.

Figure 4A:
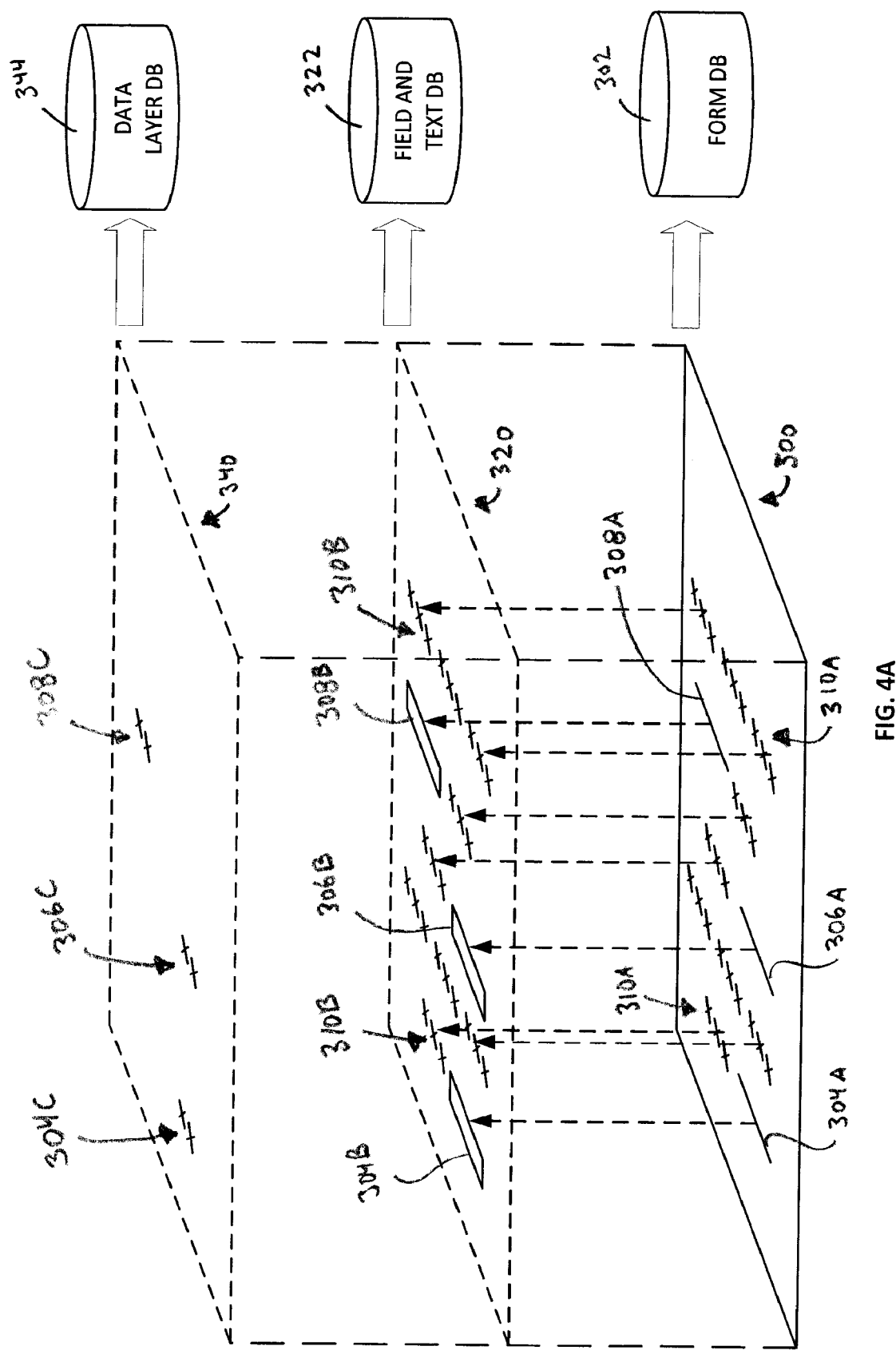

FIG. 4A another schematic depiction of various electronic layers that can be supplied to, or generated by, a form templating computing system in accordance with one non-limiting embodiment. The electronic form 300 and layers 320 and 340 are generally similar to the layers illustrated in FIG. 3. In this embodiment, however, some or all of the text portions 310A from the electronic form 300 are brought into the user input field layer 320. In this regard, the text portions 310B in the user input field layer 320 can be optionally edited or altered by a user of the system.

Figure 4B:
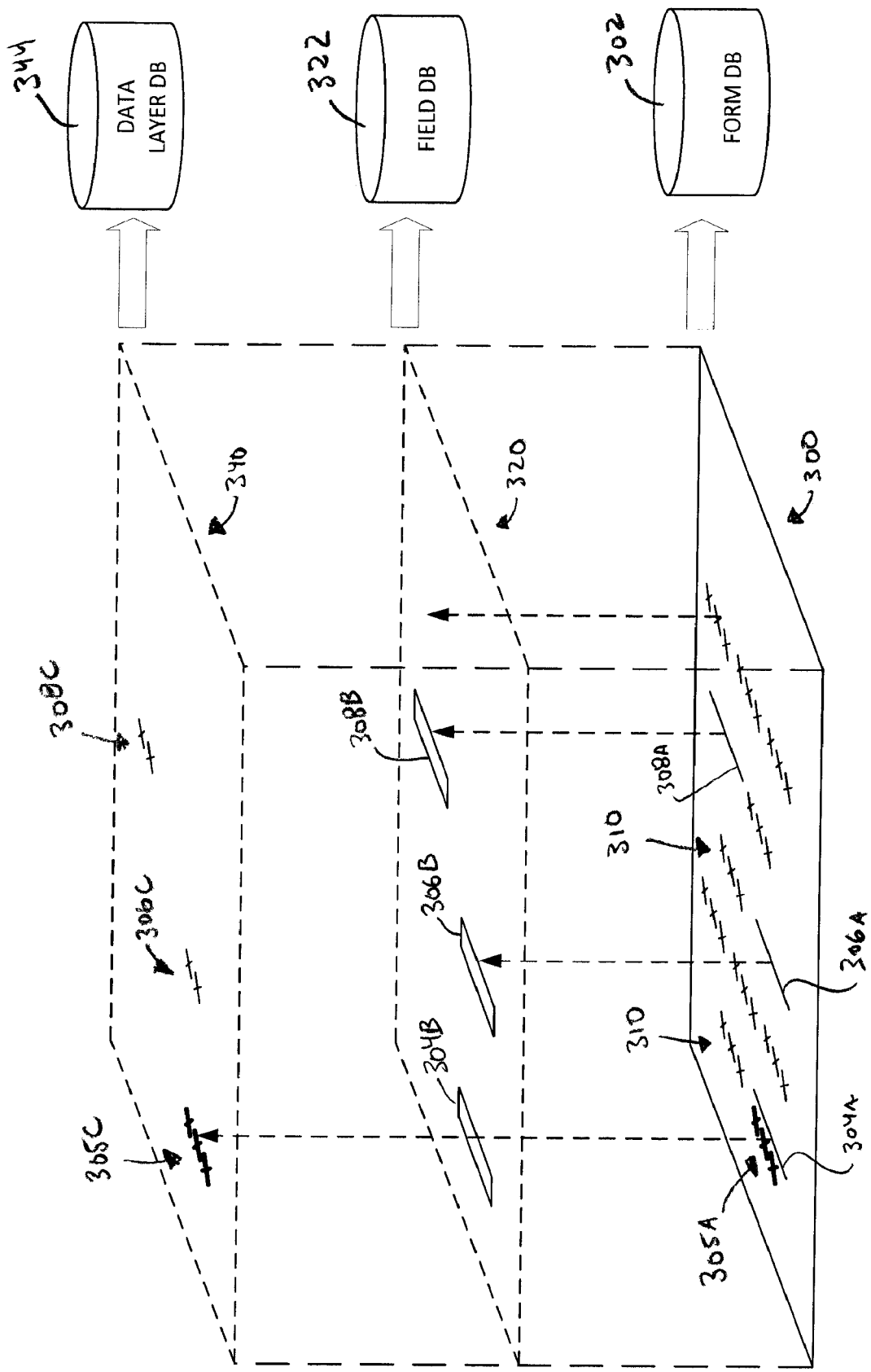

FIG. 4B another schematic depiction of various electronic layers that can be supplied to, or generated by, a form templating computing system in accordance with one non-limiting embodiment. The electronic form 300 and layers 320 and 340 are generally similar to the layers illustrated in FIG. 3. In this embodiment, however, the user input element 304A includes form data 305A at the time of processing. Depending on the circumstances, the form data 305A could have been typed into the electronic form 300 before it was provided to the system. Alternatively, the form data 305A could have been hand-written into the form before the form was electronically scanned to create the electronic form 300. In any event, as shown by layer 320, the form data 305A can be scanned and interpreted and then used to populate the user input fields 304B, shown as interpreted form data 305C. If the form data 305A is handwritten, the interpreted form data 305C can either be the form data 305A presented in typeface or it can be presented as image or reproduction of the handwritten form data. Next, as described above, a user can supply user data inputs 306C, and 308C to a data layer 340. In some cases, the user is permitted to update or alter the interpreted form data 305C. The interpreted form data 305C can be stored in any suitable data store, such as the data layer database 344

Figure 5:
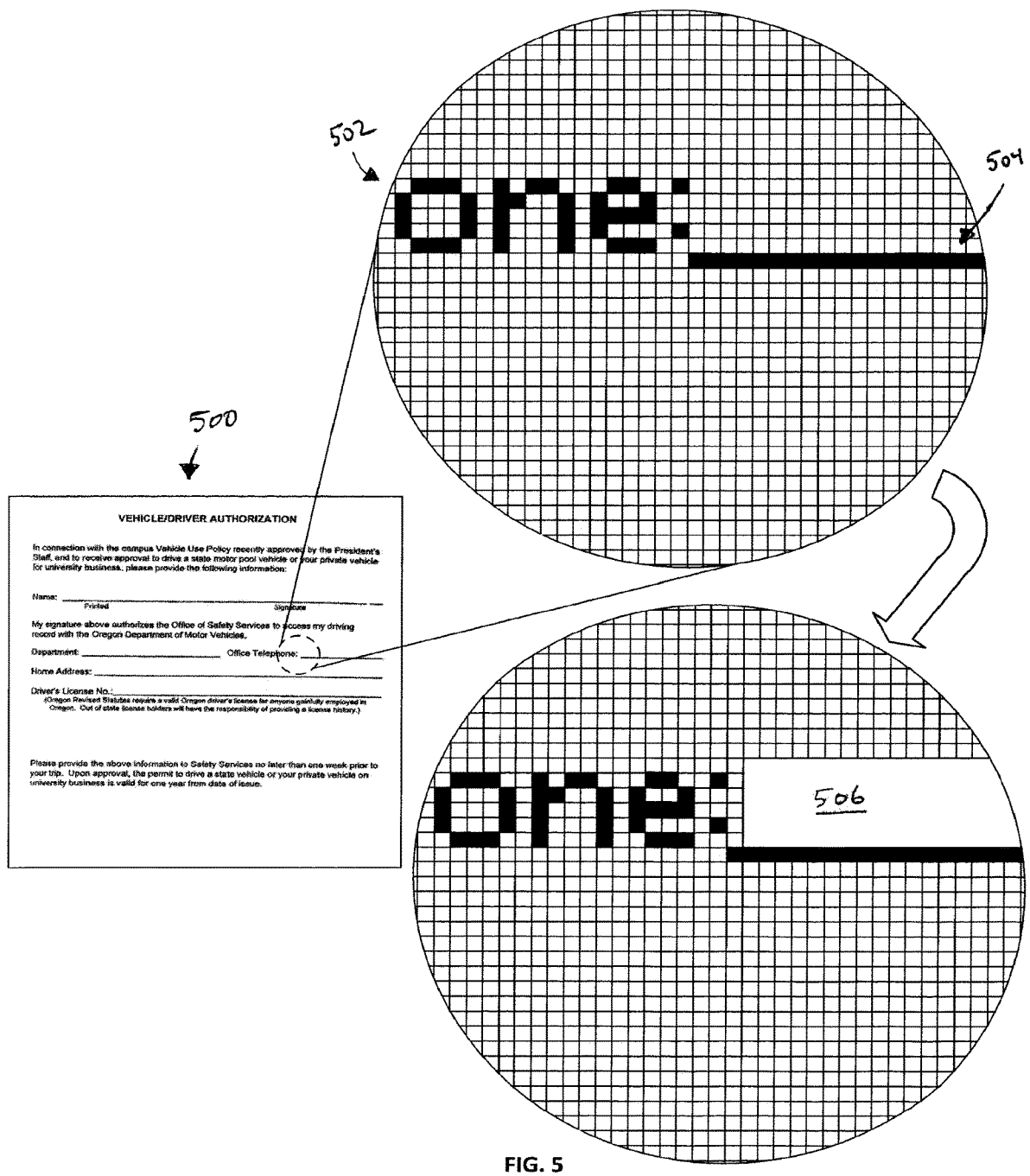
FIG. 5 depicts an example technique for recognizing a user input element of an electronic form.

FIG. 5 depicts an example technique for recognizing a user input element in an electronic form 500. In one embodiment, the image of the electronic form 500 is processed as a two dimensional array of pixels. Each pixel is inspected starting at the top/left, reading left to right and top to bottom. Each pixel can be in an "on" state or an "off" state. If a pixel is "on", proximate pixels are analyzed to determine if it is a line or just a letter, smudge, etc. on the electronic form. Once every pixel has been inspected, and all user input elements have been identified (lines, boxes, radio buttons, etc.), for each user input element a user input field 506 is generated at the left most coordinate of the line 504 and with the appropriate width. In some embodiments, the text 502 positioned proximate the line 504 can be interpreted by the system to determine one or more contextual tags to associate with the user input field 506. In the illustrated embodiment, for example, the contextual tag "office telephone" would be associated with the user input field 506 due to its close proximity to the user input field 506 and the absence of any other proximate text. Additional details regarding an example algorithm for line recognition are available in Daghameen, K., and Arman, N, "An Efficient Algorithm for Line Recognition Based On Integer Arithmetic," The 2nd Palestinian International Conference on Computer and Information Technology (PICCIT 2007), pp. 20-24, Sep. 1-3, 2007, Palestine Polytechnic University, Hebron, Palestine, the entirety of which is incorporated herein by reference.

FIG. 6 depicts an operational example of processing an electronic form to identify user input elements and associated user input fields. In the illustrated example, an electronic form 600 is uploaded to the system. The electronic form 600 can be, for example, an electronically scanned image of a physical document, a PDF document, an image file, a word processing document, or any other electronic format. The electronic form 600 comprises a plurality of user input elements, shown as 604A, 606A, 608A, 610A, 612A, and 614A. The electronic form 600 also comprises text portions 602. The electronic form 600 is scanned and interpreted in accordance with the present disclosure to identify user input fields 604B, 606B, 608B, 610B, 612B, and 614B. As illustrated, each user input fields 604B, 606B, 608B, 610B, 612B, and 614B generally corresponds in size to the underlying user input element 604A, 606A, 608A, 610A, 612A, and 614A presented on the underlying electronic form 600. Each user input field 604B, 606B, 608B, 610B, 612B, and 614B can be stored as a row (or other suitable schema) in an associated user input field table 650. In the illustrated example, the user input field table 650 comprises a document ID column 652, a field id column 654, a Cartesian start point column 656, a Cartesian end point column 658, and a tag column 660.

The data stored in the document ID column 652 can include an identifier that uniquely identifies the electronic form 600. The document ID can be used by the system to identify when the same document, or similar document, is provided to the system by a user. The data stored in the field ID column 654 can include an identifier to track the user input field. The data stored in the Cartesian start point column 656 can indicate the lower leftmost corner of a user input field, with the origin of the coordinate system placed at the lower leftmost corner of the electronic form 600. The data stored in the Cartesian end point column 658 can indicate the upper rightmost corner of a user input field. The data in the tag column 660 can include the contextual tags or attributes that are associated with the user input field.

Figure 7:
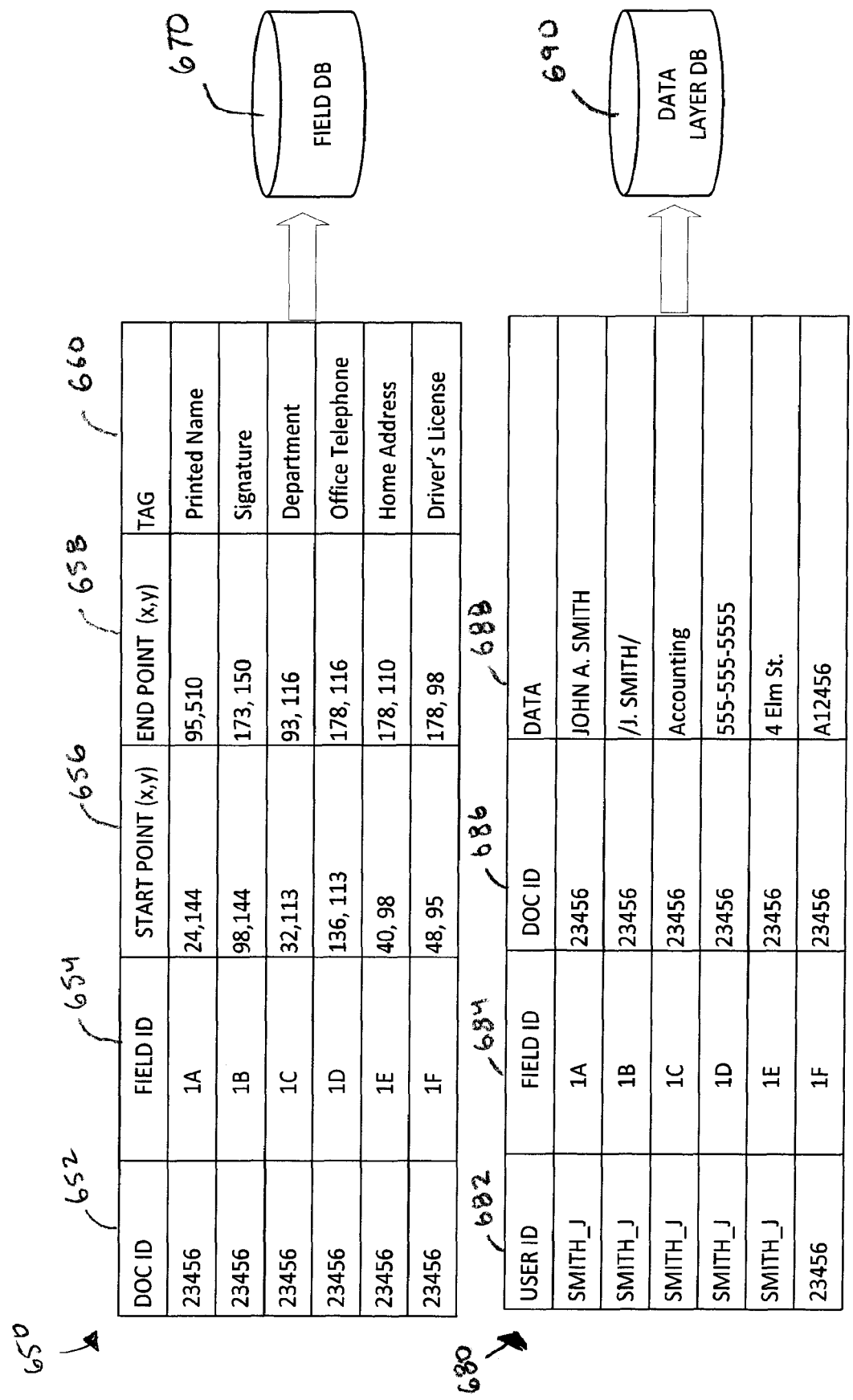

Referring to FIG. 7, the user input field table 650 can be stored in, for example, a field database 670. A user data input table 680 can be generated once a user supplies information to one or more of the user input fields field 604B, 606B, 608B, 610B, 612B, and 614B. The user data input table 680 can include, for example, a user ID column 682, a field ID column 684, a document ID column 686, and a data column 688. As illustrated, the user data input table 680 can be stored in a data layer database 690. The data stored in the data column 688 can include the information supplied by the user during interactions with the system. If a particular field is determined to appear in a plurality of locations within a particular electronic form, the system can automatically populate the other instances once the first field is populated. By way of example, a user input field with the contextual tag "home address" may appear in five different places within a multi-page electronic form. Once the use supplies data for one instance of a "home address" user input fields, the remaining fields can be populated as well.

FIGS. 8A-8F depict example processing of an electronic form in accordance with various embodiments. In some embodiments, the system generally serially steps through the electronic form 800 to identify user input elements and determine one or more suggested contextual tags. The user can be prompted to select one of the suggested contextual tags or to provide a contextual tag for the user input field. In other embodiments, the identification of user input fields and contextual tagging of the fields can occur generally transparently to the user. In still some other embodiments, a user can be giving the ability to update or other modify a user input field (i.e., change a contextual tag, change a position or size of the field, and so forth). For the purposes of illustration, FIGS. 8A-8D display an example system that includes user confirmation of the contextual tags.

Referring first to FIG. 8A an electronic form 800 is displayed on a graphical display of a user device 830. The electronic form 800 is a real estate transactional form and is visually similar to a physical document. The electronic form 800 can be pulled from a database local to the system or uploaded, or otherwise provided by a user or other service provider. The electronic form 800 includes user input elements 804A, 806A, 808A, 810A, 812A, 814A, 816A. The electronic form 800 also includes text portions 802. Once the processing is started, the electronic form 800 can be scanned to identify text and to identify the user input elements 804A, 806A, 808A, 810A, 812A, 814A, 816A.

Referring now to FIG. 8B, the user input field 804B is presented to the user. The user input field 804B corresponds to the user input element 804A. In the illustrated embodiment, a user confirmation menu 850 is presented to the user. The user confirmation menu 850 can display one or more suggested contextual tags for the field (shown as "seller"). The user can then provide an input to the system to indicate if the suggested contextual tag is correct. Using the navigation menu 860, the user can step through other user input fields that have been identified by the system.

Referring now to FIG. 8C, the user input field 808B is presented to the user. The user input field 808B corresponds to the user input element 808A. In the illustrated embodiment, the user confirmation menu 850 displays a plurality of suggested contextual tags for the field. The user can then provide an input to the system to indicate if one of the suggested contextual tags is correct or provide another contextual tag. The user confirmation menu 850 can display a plurality of suggested contextual tags when the system is unable to identify a single contextual tag with a sufficient level of confidence.

Referring now to FIG. 8D, the user input field 814B is presented to the user. The user input field 814B corresponds to the user input element 814A. In the illustrated embodiment, the user confirmation menu 850 displays a suggested contextual tag as well as a suggested data type for the contextual tag (i.e., "number input only".) The data type for the suggested tag can be stored by the system and be used to limit the type of data a user can supply as input to that particular user input field. In the illustrated embodiment, the user input field 814B is associated with a lot dimension, so based on the term "lot dimension", the system has determined that it is likely a number will be provided by the user.

Figure 8E:
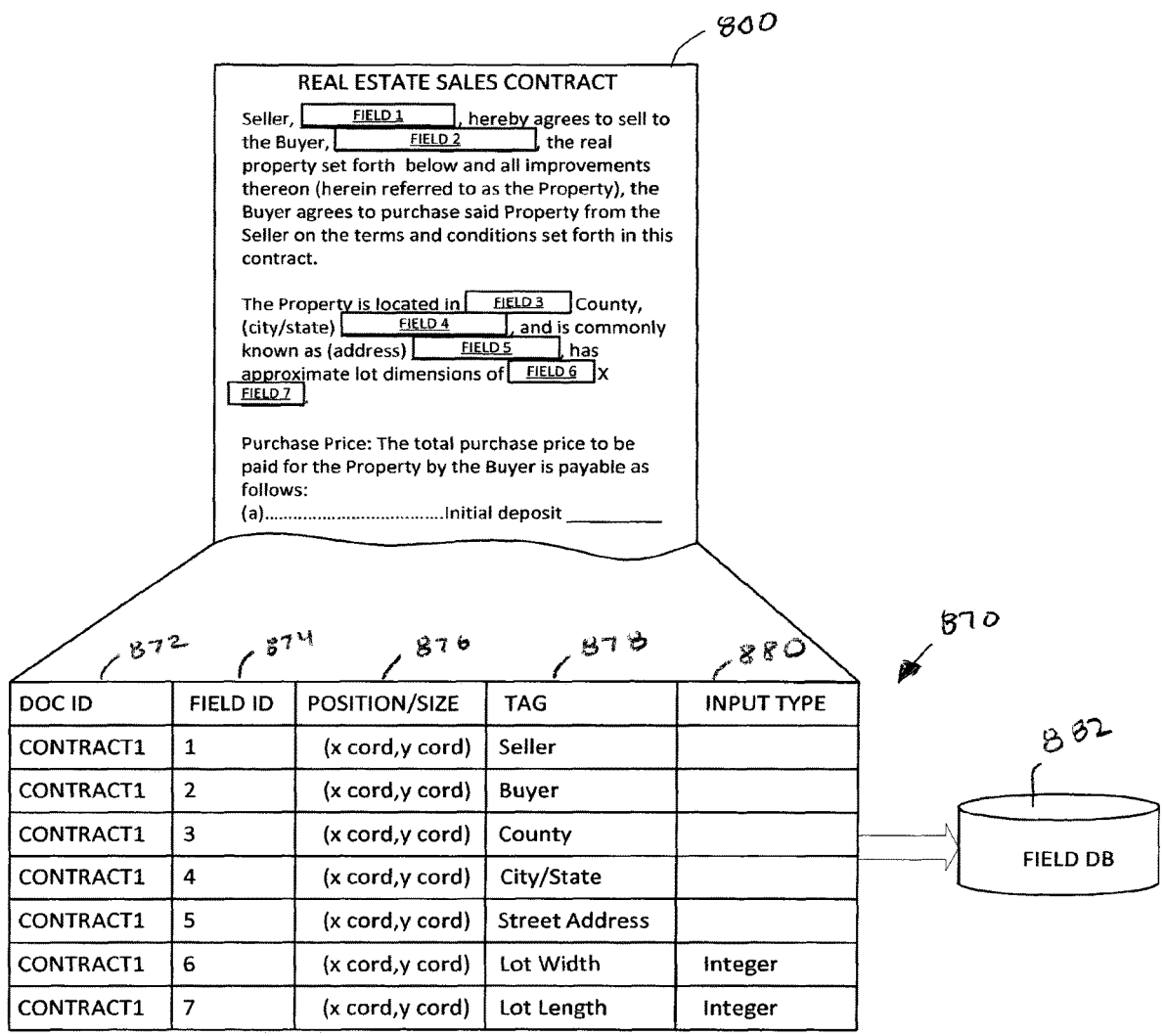

FIG. 8E displays the electronic form 800 with user input fields positioned proximate to the user input elements. The user input fields shown in FIG. 8E could have been serially generated through user confirmation (i.e. as shown in FIGS. 8A-8D) or automatically generated with little or no user interaction. In any event, a user input field table 870 can be generated and stored in a field database 882. In one embodiment, the user input field table 870 comprises a document ID column 872, a field ID column 874, a position/size column 876, a tag column 878, and an input type column 880.

Figure 8F:
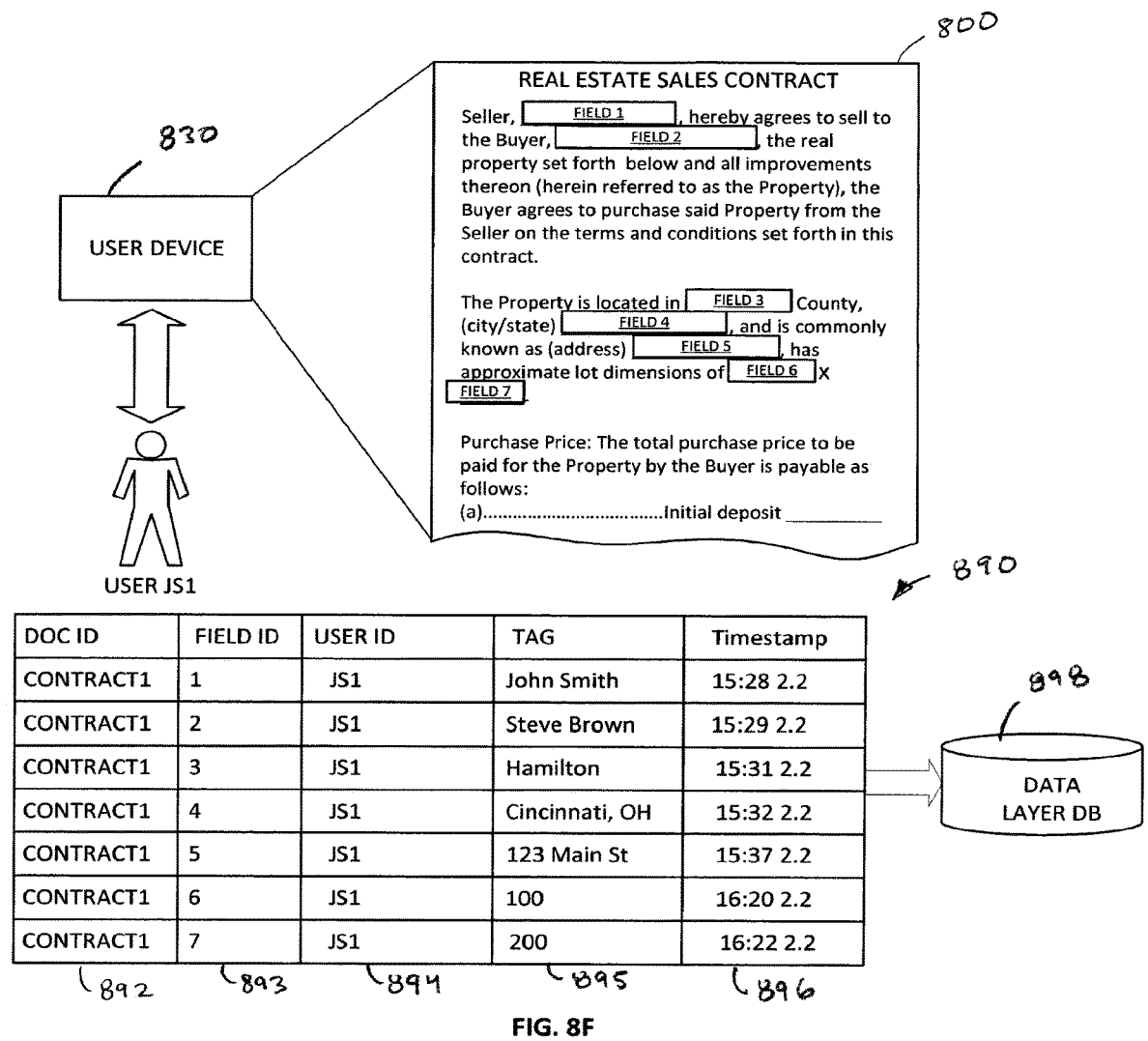

FIG. 8F schematically illustrates a user JS1 interacting with the user device 830 to supply data to the various user input fields. The data received from the user JS1 can be stored in a user data input table 890. The user data input table 890 can be stored in, for example, a data layer database 898. The user data input table 890 can comprise various columns, such as a document ID column 892, a field ID column 893, a user ID column 894, a tag column 895, and a timestamp column 896. The data in the timestamp column 896 can be used to determine when the data was supplied by the user JS1.

Figure 9:
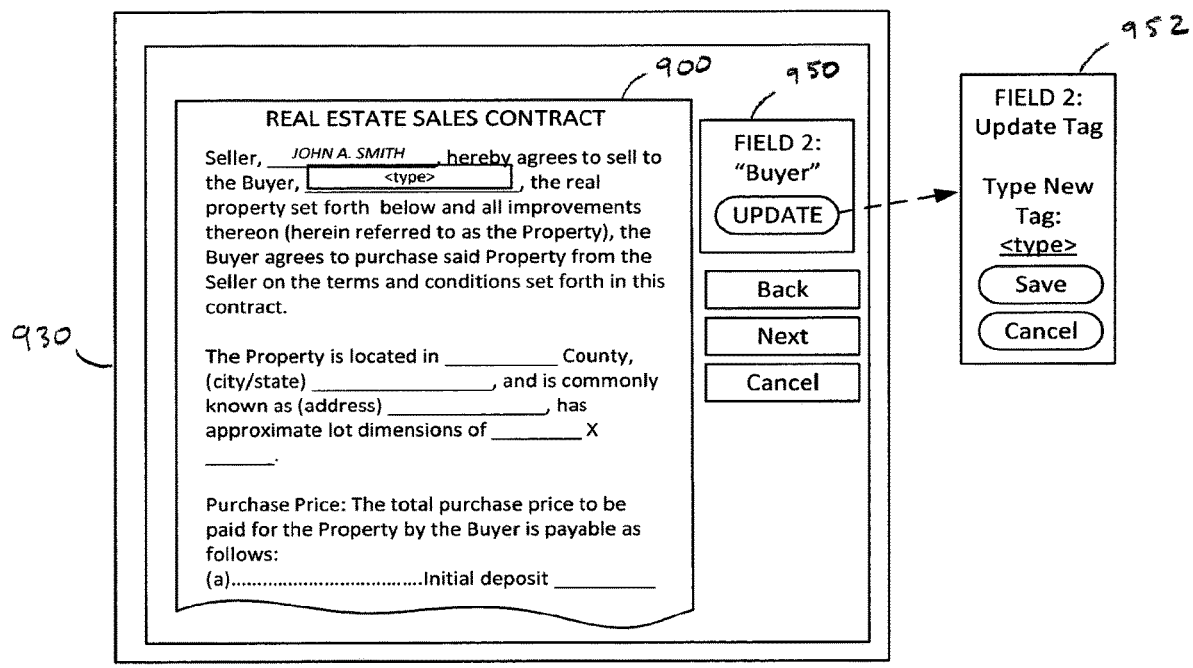
FIG. 9 depicts an update to a user input field of an electronic form.

FIG. 9 depicts an update to a user input field of an electronic form. In the illustrated embodiment, a user is interacting with an electronic form 900 via a user device 930. While supplying data, the user may notice that a contextual tag, or other attribute associated with a user input field is inaccurate or should otherwise be changed. The user can activate an "update" element on a user input field menu 950. The user can be presented with an update tag menu 952. Through interactions with this menu 952, the user can change the contextual tag, or make other changes to the user input field. These inputs can be stored in the user input field table (not shown) so that the updated contextual tags will be used for future interactions with the electronic form 900.

Figure 10:
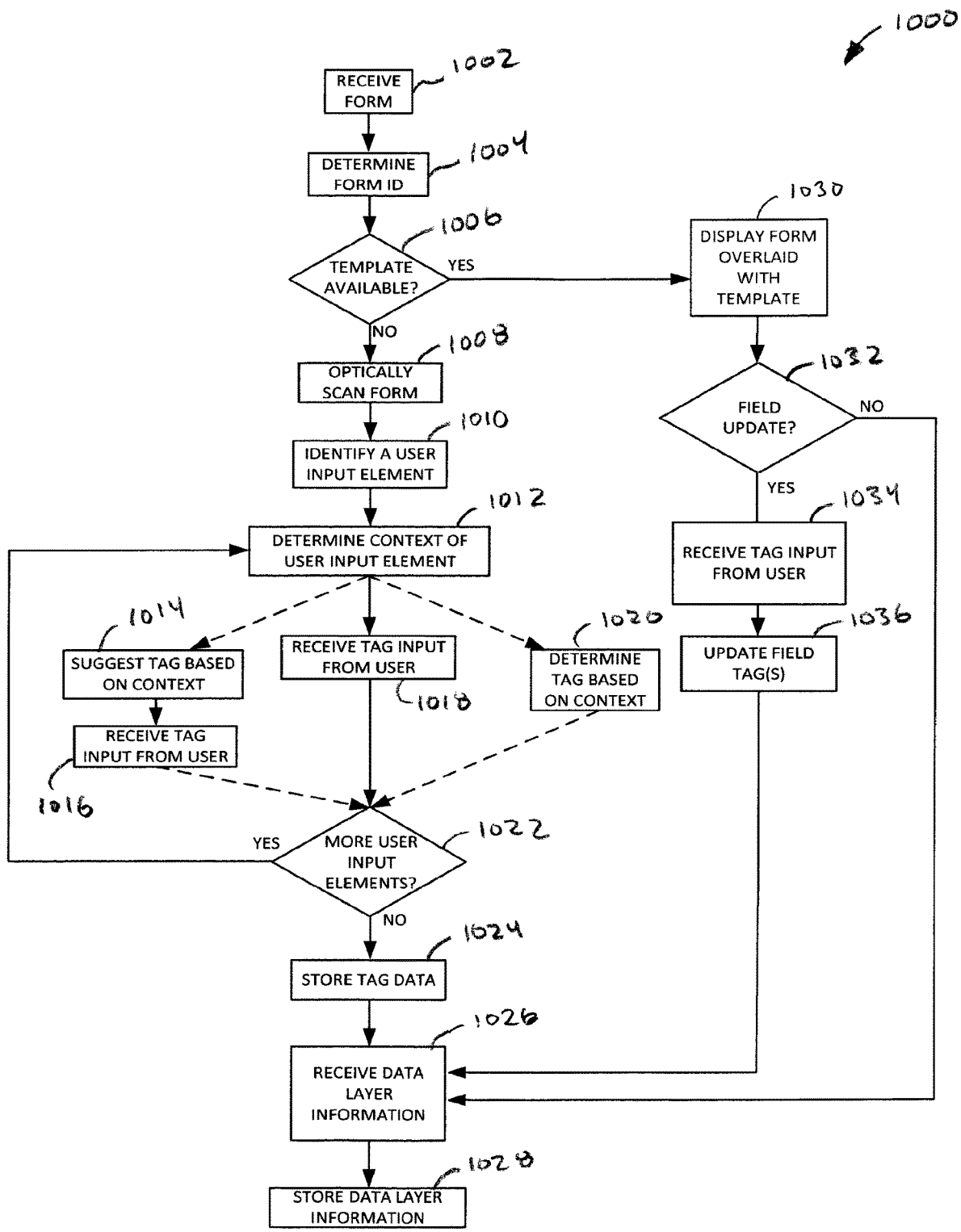
FIG. 10 is an exemplary flowchart of the operation of a form templating computing system.

Referring now to FIG. 10, an exemplary flowchart 100 of the operation of a form templating computing system is presented. At block 1002, a form is received by the system. The form can be received from any suitable supplier, including a database local to the system, from the user, from a third party, or from other form repositories. At block 1004, the form ID is determined through any suitable technique. In some embodiments, the form ID is native to the document (i.e., stored in metadata associated with the form). In other embodiments, the form is processed with a hash function, or other processes, to create a unique ID. In any event, at block 1006, the form ID is used to determine if a template of user input fields for that form is available. If no template is available, the system will process the form to generate the user input fields. At block 1008, the form is optically scanned, such as using an OCR technique. At block 1010, a user input element is identified. The user input element can be, without limitation, an answer blank, a box, a radio button, or other type of user input element of the form that is identified by the system.

At block 1012, the context of the user input element is identified. This context can be determined, for example, by considering text that is positioned proximate to the user input element, the relative position of the user input element on the page, the position of the user input element relative to other user input elements, and so forth. Depending on the configuration of the system, contextual tagging can occur in a variety of ways. In a first embodiment, as shown by block 1014 and block 1016, a suggestion for a contextual tag is presented to a user with a tag input then received from the user. In another embodiment, as shown by block 1018, the system does not necessarily provide suggestions to the user, but instead simply prompts the user to provide a contextual tag for the user input field. It is noted that for this type of processing, block 1012 does not need to be utilized. In yet another embodiment, as shown by block 1020, the system can determine one or more contextual tags without necessarily seeking user confirmation. Once the first user input field is identified and tagged, it is determined at block 1022 if the form has more user input elements. If so, the process returns to block 1012 to determine the context for that additional user input element. If there are no more user input elements, the contextual tag data is stored at block 1024. At block 1026 data layer information is received. The data layer information can be received when the form is utilized in a business work flow, for example. At block 1028, the data layer information can be stored.

Referring again to block 1006, if it is determined that a template is available, at block 1030 the form is displayed along with the template. If the system is configured to allow a user to update the user input fields, at block 1032 it is determined if there is an update to a field. If there is an update, at block 1034 tag input is received from the user. The tag input can comprise, for example, updates to the contextual tagging, changing of a size or position of the user input field, or a removal of the tag. At block 1036, the user input fields are updated in the corresponding database. If there is no update at block 1032, the process proceeds to block 1026 to receive data layer information.

Form templating computing systems, as described herein, can include software modules, processes, application programming interfaces or APIs, drivers, helper applications such as plug-ins, databases such as search and query databases, and other types of software modules or computer programming as would be understood in the art. Form templating computing systems can include hardware modules such as a database or data store, computing resources, and network and communication interfaces. The modules can be networked together or share a common data bus. Data can be encrypted or protected from unauthorized access. The database can be a memory or storage device including, but not limited to random access memory (RAM) such as dynamic RAM (DRAM), static ram (SRAM), flash memory, disk drives, hard drives, redundant array of individual disks or RAID drives, virtual drives, networked drives and memory available using cloud computing. The computing resources can include physical components, for example processing units such as CPUs, multi-processing units, reduced instruction set computers (RISC), processors that have pipelines, complex instruction set computers (CISC), or digital signal processors (DSP.) The computing resources can also include distributed computing devices, cloud computing resources, and virtual computing resources in general. Network and communication interfaces can include any suitable physical device and protocol including, but not limited to, wired data transmission links such as Ethernet and TCP/IP or PSTN communications links such as T1s or better, ISDN, Digital Subscriber Line (DSL), or dialup modems running a point-to-point protocol or PPP. The network and communication interfaces can also include wireless protocols including cellular network providers, for example Code Division Multiple Access (CDMA) and Global System for Mobile Communications (GSM) providers. The processes described above can be performed on or between one or more computing devices.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The invention claimed is:

1. A form templating system, comprising:
a form templating computing device comprising as least one processor and at least one tangible computer readable medium having instructions stored thereon which when executed by the processor cause the processor to:
receive an electronic version of a form, wherein the form comprises a plurality of user input elements and a text portion and wherein the electronic version of the form has a first resolution;
identify each of the plurality of user input elements of the form;
generate user input fields corresponding to each of the plurality of user input elements;
store the generated user input fields in a user input field layer;
determine one or more contextual tags for each of the user input fields of the form, wherein at least one of the contextual tags is based on a text, of the text portion, that is positioned proximate to the user input element;

store, in connection with the electronic version of the form, for each of the generated user input fields, (1) dimensional placement data, (2) at least one contextual tag, and (3) a type for the user input field, wherein the dimensional placement data correlates the placement of the user input field relative to the electronic version of the form;

receiving input corresponding to a first user input field stored in the user input field layer;

receiving input corresponding to a second user input field stored in the user input field layer, wherein each user input field stored in the user input field layer has a second resolution and wherein the second resolution is lower than the first resolution; and providing, for display, the electronic version of the form having the first resolution and the user input field layer storing the generated user input fields having the second resolution and including the received inputs.

2. The form templating system of claim 1, wherein a first user input element corresponding to the first user input field appears in a plurality of instances on the electronic version of the form.

3. The form templating system of claim 2, wherein the instructions further cause the processor to:

in response to receiving user input for one of the plurality of instances of the first user input element, automatically populate other instances of the first user input element with the received user input.

4. The form templating system of claim 1, wherein the plurality of user input elements comprise at least one box and at least one line.

5. The form templating system of claim 1, wherein the electronic version of the form comprises a unique electronic fingerprint.

6. The form templating system of claim 5, further comprising:

generating the unique electronic fingerprint for the electronic version of the form, wherein generating the unique electronic fingerprint for the electronic version of the form comprises applying a hash process to the electronic version of the form.

7. The form templating system of claim 1, wherein the electronic version of the form is received from a form database and wherein the user input fields of the user input field layer are stored in a field database separate from the form database.

8. The form templating system of claim 7, wherein each user input field of the user input field layer dimensionally corresponds to an underlying user input element of the form.

9. A computer-implemented method, comprising:

receiving, by a form templating computing device, an electronic version of a form, wherein the form comprises a plurality of user input elements and a text portion and wherein the electronic version of the form has a first resolution;

identifying, by the form templating computing device, each of the plurality of user input elements of the form;

generating, by the form templating computing device, user input fields corresponding to each of the plurality of user input elements, wherein each of the user input fields is stored in a user input field layer;

determining, by the form templating computing device, one or more contextual tags for each of the user input fields of the form, wherein at least one of the contextual tags is based on a text, of the text portion, that is positioned proximate to the user input element;

storing, by the form templating computing device, in connection with the electronic version of the form, for each of the generated user input fields, (1) dimensional placement data, (2) at least one contextual tag, and (3) a type for the user input field, wherein the dimensional placement data correlates the placement of the user input field relative to the electronic version of the form;

receiving input corresponding to a first user input field stored in the user input field layer, wherein each user input field stored in the user input field layer has a second resolution, and wherein the first resolution is lower than the second resolution;

receiving input corresponding to a second user input field stored in the user input field layer having the second resolution; and providing, for display, the electronic version of the form having the first resolution and the user input field layer storing the generated user input fields having the second resolution and including the received inputs.

10. The computer-implemented method of claim 9, wherein at least one text of the text portion is identified using optical character recognition.

11. The computer-implemented method of claim 9, wherein the dimensional placement data associated with a first user input field comprises an indication of the lower leftmost corner of the first user input field and an indication of the upper rightmost corner of the first user input field.

12. The computer-implemented method of claim 9, further comprising:

receiving input for a first user input field at a first location of the form;

determining that the first user input field of the form appears in a plurality of locations within the electronic version of the form; and in response to determining that the first user input field of the form appears in a plurality of locations within the electronic version of the form, populating instances of the first user input field with the received input at locations of the form other than the first location of the form.

13. The computer-implemented method of claim 9, further comprising:

displaying the electronic version of the form at the first resolution while displaying, at the second resolution, at least one user input field of the user input field layer having the second resolution.

14. A computer-implemented method, comprising:

receiving, by a form templating computing device, an electronic version of a form, wherein the form comprises a plurality of user input elements and a text portion and wherein the electronic version of the form has a first resolution;

identifying, by the form templating computing device, each of the plurality of user input elements of the form;

generating, by the form templating computing device, user input fields corresponding to each of the plurality of user input elements, wherein each of the user input fields is stored in a user input field layer, wherein each user input field has a second resolution, wherein the first resolution is higher than the second resolution;

determining, by the form templating computing device, one or more contextual tags for each of the user input fields of the form, wherein at least one of the contextual tags is based on a text, of the text portion, that is positioned proximate to the user input element;

storing, by the form templating computing device, in connection with the electronic version of the form, for each of the generated user input fields, (1) dimensional placement data, (2) at least one contextual tag, and (3) a type for the user input field, wherein the dimensional placement data correlates the placement of the user input field relative to the electronic version of the form;

receiving input corresponding to a first user input field stored in the user input field layer;

receiving input corresponding to a second user input field stored in the user input field layer; and providing, for display, the electronic version of the form having the first resolution and the user input field layer storing the generated user input fields having the second resolution and including the received inputs.

15. A computer-readable hardware device storing instructions that, in response to being executed by a computing system having a processor, cause the computing system to perform a method comprising:

receiving an electronic version of a form, wherein the form comprises a plurality of user input elements and wherein the electronic version of the form has a first resolution;

for each of the user input elements, generating a user input field corresponding to the user input element, wherein each of the user input fields is stored in a user input field layer, wherein each user input field has a second resolution, wherein the second resolution is greater than the first resolution;

for each of the generated user input fields, determining one or more contextual tags for the generated user input field;

storing in a user input field layer in connection with the electronic version of the form, for each generated user input field, (1) dimensional placement data, (2) at least one contextual tag, and (3) a type for the user input field;

receiving input corresponding to a first user input field stored in the user input field layer;

receiving input corresponding to a second user input field stored in the user input field layer;

providing, for display, the electronic version of the form having the first resolution and the user input field layer storing the generated user input fields having the second resolution and including the received inputs.

16. The computer-readable hardware device of claim 15, wherein the plurality of user input elements comprises at least one radio button.

17. The computer-readable hardware device of claim 15, wherein determining at least one of the contextual tags comprises:

suggesting two or more contextual tags to a user of the computing system; and receiving, from the user, a selection of at least one of the suggested two or more contextual tags.

18. The computer-readable hardware device of claim 17, the method further comprising:

suggesting a data type for each of the suggested two or more contextual tags to the user of the system.

19. The computer-readable hardware device of claim 15, the method further comprising:

receiving, from the user, an update to at least one of the determined one or more contextual tags.

20. The computer-readable hardware device of claim 15, wherein determining at least one of the contextual tags to be associated with a first user input field comprises identifying text that is positioned proximate to the first user input field.

* * * * *

UNITED STATES PATENT AND TRADEMARK OFFICE
CERTIFICATE OF CORRECTION

PATENT NO. : 10,552,525 B1
APPLICATION NO. : 14/620262
DATED : February 4, 2020
INVENTOR(S) : Allison et al.

It is certified that error appears in the above-identified patent and that said Letters Patent is hereby corrected as shown below:

On the Title Page

In item (56), in Column 2, under "Foreign Patent Documents", Line 1, delete "102002009259" and insert -- 1020020092595 --, therefor.

In item (56), in Column 2, under "Foreign Patent Documents", Line 2, delete "102007005993" and insert -- 1020070059931 --, therefor.

On the page 3, in Column 2, under "Other Publications", Line 27, delete ".ihfa." and insert -- .fhfa. --, therefor.

In the Specification

In Column 8, Line 28, after "344" insert -- . --.

In the Claims

In Column 12, Line 52, in Claim 1, delete "as" and insert -- at --, therefor.

In Column 13, Line 2, in Claim 1, after "the" insert -- corresponding --.

In Column 13, Line 11, in Claim 1, delete "receiving" and insert -- receive --, therefor.

In Column 13, Line 13, in Claim 1, delete "receiving" and insert -- receive --, therefor.

In Column 13, Line 18, in Claim 1, delete "providing," and insert -- provide, --, therefor.

In Column 15, Line 33, in Claim 15, delete "a" and insert -- the --, therefor.

Signed and Sealed this
Fifth Day of May, 2020

Andrei Iancu
*Director of the United States Patent and Trademark Office*

In Column 16, Line 7, in Claim 15, after "layer;" insert -- and --.

In Column 16, Line 28, in Claim 19, delete "from the" and insert -- from a --, therefor.